(12) United States Patent
Galarneau et al.

(10) Patent No.: US 8,526,827 B2
(45) Date of Patent: Sep. 3, 2013

(54) OPTICAL TIME-DELAYED WAVELENGTH CONVERTER

(75) Inventors: Pierre Galarneau, Quebec (CA); Martin Rochette, Montreal (CA)

(73) Assignee: Institut National d'Optique, Quebec (CA)

( * ) Notice: Subject to any disclaimer, the term of this patent is extended or adjusted under 35 U.S.C. 154(b) by 171 days.

(21) Appl. No.: 13/188,881

(22) Filed: Jul. 22, 2011

(65) Prior Publication Data

US 2013/0022358 A1    Jan. 24, 2013

(51) Int. Cl.
*H04B 10/00* (2013.01)

(52) U.S. Cl.
USPC .......................................................... 398/173

(58) Field of Classification Search
USPC ..................................... 398/173; 385/14, 24
See application file for complete search history.

(56) References Cited

U.S. PATENT DOCUMENTS 7,343,065 B2 * 3/2008 Maeda ............................ 385/24
7,369,719 B2 * 5/2008 Bernasconi et al. ............ 385/14

OTHER PUBLICATIONS

Martin Rochette, Lawrence R. Chen, Kai Sun, Juan Hernandez-Cordero; Multiwave and Tunable Self-Pulsating Fiber Cavity Based on Regenerative SPM Spectral Broadening and Filtering; IEEE Phtonics Technology Letters; Sep. 1, 2008; pp. 1497-1499; vol. 20, No. 17.
Martin Rochette, Kai Sun, Juan Hernandez-Cordero, Lawrence R. Chen; Multiwavelength and Tunable Regenerative Laser Resonator with Passive Self-Pulsating Action.
Martin Rochette, Kai Sun, Juan Hernandez Cordero, Lawrence R. Chen; Multiwavelength Self-Pulsating Fibre Laser Based on Cascaded SPM Spectral Broadening and Filtering; Proc. of SPIE; vol. 7099, 70990N-1.
K. Sun, M. Rochette, L.R. Chen; Output Characterization of a Self-Pulsating and Aperiodic Optical Fiber Source Based on Cascaded Regeneration; Optics Express; Jun. 8, 2009; vol. 17, No. 12.
Martin Rochette, Justin L. Blows, Benjamin J. Eggleton; 3R Optical Regeneration: An All-Optical Solution with BER Improvement; Optics Express; Jul. 10, 2006; vol. 14, No. 14.

* cited by examiner

*Primary Examiner* — Shi K Li
*Assistant Examiner* — Jamil Ahmed
(74) *Attorney, Agent, or Firm* — Norton Rose Fulbright Canada LLP

(57) ABSTRACT

There is described a method for converting the wavelength of a pulsed optical signal. An input pulsed signal containing information and having an input wavelength is buffering by propagating the input pulsed signal in a closed-loop optical regenerative cavity. The propagation comprises converting the input pulsed signal at the input wavelength to a buffer pulsed signal at an adjustable wavelength and propagating the buffer pulsed signal within the cavity. The adjustable wavelength is set to a buffer wavelength different from the output wavelength and the buffer pulsed signal contains the information encoded in the input pulsed signal. The output wavelength is determined from the information encoded in the input pulsed signal. Upon determination of the output wavelength, the adjustable wavelength of the buffer pulsed signal is set to the output wavelength in order to; outputting the buffer pulsed signal at the output wavelength from the cavity.

18 Claims, 7 Drawing Sheets

OPTICAL TIME-DELAYED WAVELENGTH CONVERTER

CROSS-REFERENCE TO RELATED APPLICATIONS

This is the first application filed for the present invention.

TECHNICAL FIELD

The present invention relates to the field of optical wavelength converter systems, and particularly to systems having both wavelength converting and time delay line capabilities.

BACKGROUND

In all-optical wavelength-agile telecommunication networks, wavelength converters are used for converting the wavelength of an optical signal carrying a data packet in order to propagate the data packet into an appropriate channel. The selection of the appropriate channel is performed according to the destination address of the data packet. The destination address encoded in the data packet must first be read in order to determine the appropriate channel before converting the wavelength of the optical signal carrying the data packet to the appropriate wavelength corresponding to the appropriate channel. The determination of the appropriate channel and the wavelength conversion represent time-consuming processes. Therefore, a time delay must be introduced in the propagation of the optical signal in order to allow for the determination of the appropriate channel and the conversion of the optical signal to the appropriate wavelength.

In order to introduce a time delay in the propagation of the optical signal, delay lines, such as "slow light" devices, adapted to slow down the propagation speed of an optical signal can be used along with optical wavelength converters. For example, photonic crystals presenting slow light propagation modes can be used to reduce the propagation speed of the optical signal carrying the data packet while the appropriate channel is determined and the optical wavelength converter is adjusted to the appropriate wavelength. In another example, the slowing down of the optical signal may be achieved by first converting the optical signal into a phonon which has a reduced propagation speed with respect to that of light, and then converting the phonon back into an optical signal. The phonon may be generated via Brillouin scattering by propagating the optical signal into an adequate medium such as an optical fiber or a crystal for example. However, because the length of the photonic crystal or that of the Brillouin scattering medium is predetermined and fixed, such "slow light" devices usually introduce a fixed time delay for the propagation of the data packet.

Therefore, there is a need for an improved wavelength converter device having time delay capability.

SUMMARY

There is described a system and method for converting the wavelength of a pulsed optical signal to a desired wavelength while inducing a delay in the propagation of the pulsed optical signal. The pulsed optical signal is propagated into a closed-loop optical regenerative cavity which may convert the wavelength of the pulsed optical signal to the desired wavelength. Furthermore, a desired adjustable delay may be introduced in the propagation of the pulsed optical signal by buffering the pulsed optical signal in the closed-loop optical regenerative cavity for a period of time corresponding to the desired delay, i.e. by propagating the pulsed optical signal in the closed-loop optical regenerative cavity for the period of time corresponding to the desired delay. The closed-loop optical regenerative cavity may be seen as an integrated wavelength converter and adjustable delay line.

According to a broad aspect, there is provided a method for converting a wavelength of a pulsed signal to an output wavelength, the method comprising: receiving an input pulsed signal containing information encoded therein and having an input wavelength; buffering the input pulsed signal by propagating the input pulsed signal in a closed-loop optical regenerative cavity, the propagating comprising converting the input pulsed signal at the input wavelength to a buffer pulsed signal at an adjustable wavelength and propagating the buffer pulsed signal within the cavity, the adjustable wavelength being set to a buffer wavelength different from the output wavelength and the buffer pulsed signal containing the information encoded in the input pulsed signal; determining the output wavelength from the information encoded in the input pulsed signal; upon the determining the output wavelength, setting the adjustable wavelength of the buffer pulsed signal to the output wavelength; and outputting the buffer pulsed signal at the output wavelength from the cavity, thereby obtaining an output pulsed signal having the output wavelength and containing the information encoded in the input pulsed signal.

According to another broad aspect, there is provided an optical time-delayed wavelength converter for adjusting a wavelength of an optical pulsed signal, the converter comprising: a photodetector for detecting and converting an input pulsed signal to an electrical signal, the input pulsed signal containing information encoded therein and having an input wavelength; an output wavelength determining module for determining the output wavelength from the electrical signal; a closed-loop optical regenerative cavity for receiving the input pulsed signal, the cavity adapted to convert the input pulsed signal at the input wavelength to a buffer pulsed signal at an adjustable wavelength, and propagate and output the buffer pulsed signal therein as a function of the adjustable wavelength, the buffer pulsed signal containing the information encoded in the input pulsed signal; and a wavelength controller for controlling the adjustable wavelength of the pulsed buffer signal, the wavelength controller adapted to set the adjustable wavelength to a buffer wavelength different from the output wavelength in order to propagate the buffer pulsed signal at the buffer wavelength within the cavity, and to the output wavelength upon reception of the output wavelength from the output wavelength determining module in order to output the buffer pulsed signal at the output wavelength from the cavity.

The expression "pulsed signal" refers to an optical signal comprising a series of pulses spaced in time. The pulses are used for encoding information into the pulsed signal. For example, the pulsed signal may be used to carry and propagate a data packet into an optical telecommunication network.

DETAILED DESCRIPTION

Figure 1:
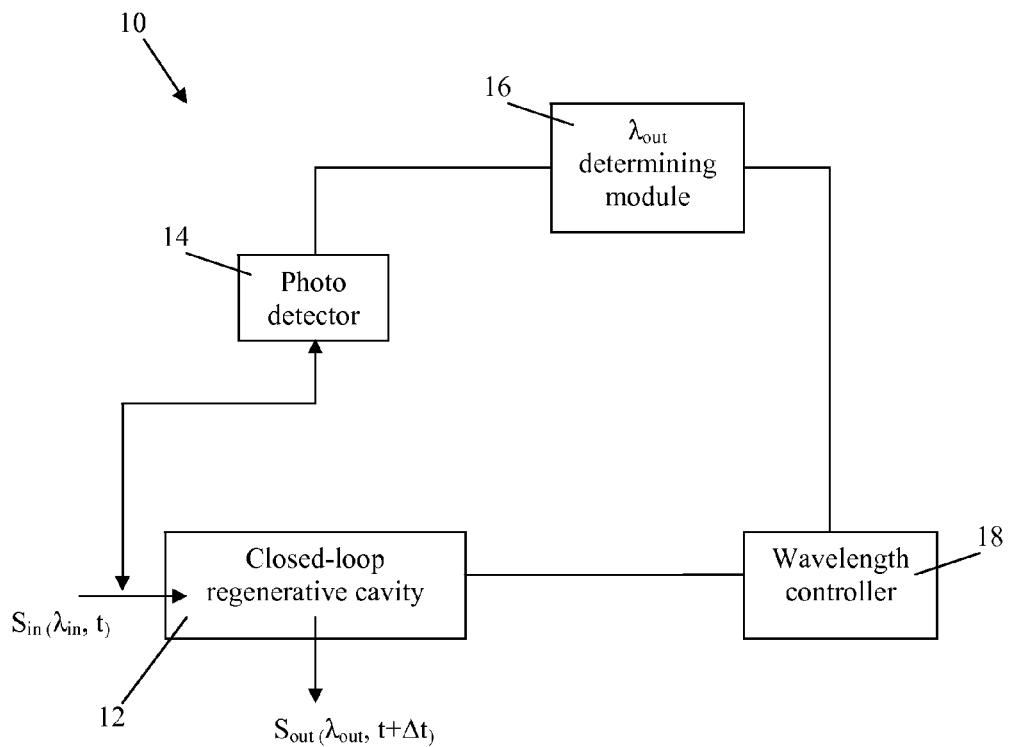
FIG. 1. is a block diagram of a time-delayed wavelength converter in accordance with a first embodiment.

FIG. 1 illustrates one embodiment of a time-delayed wavelength converter system 10 comprising a closed-loop optical regenerative cavity 12, a photodetector 14, a module for determining an output wavelength, and a wavelength controller 18.

The time-delayed wavelength converter 10 is adapted to receive an input pulsed signal $S_{in}$ having an input wavelength $\lambda_{in}$ at a time t, determine an output wavelength $\lambda_{out}$ for an output pulsed signal $S_{out}$, and control the time t+Δt at which the output pulsed signal $S_{out}$ is outputted. The input pulsed signal $S_{in}$ contains information about the output wavelength $\lambda_{out}$ encoded therein. For example, the information about the output wavelength $\lambda_{out}$ may be a particular value for the output wavelength $\lambda_{out}$ or information from which the particular value for the output wavelength $\lambda_{out}$ can be determined, such as a destination or a channel for the output wavelength $\lambda_{out}$ for example. The output pulsed signal $S_{out}$ contains substantially the same information as that encoded in the input pulsed signal $S_{in}$ but at the output wavelength $\lambda_{out}$. The time-delayed wavelength converter 10 is adapted to buffer the input pulsed signal $S_{in}$ for a time duration Δt during which the output wavelength $\lambda_{out}$ is determined and the output wavelength of the time-delayed wavelength converter 10 is set to $\lambda_{out}$. It should be understood that the input and output wavelengths $\lambda_{in}$ and $\lambda_{out}$ may be different. Alternatively, they may be substantially identical.

The closed-loop optical regenerative cavity 12 is adapted to convert the input pulsed signal $S_{in}$ at the input wavelength $\lambda_{in}$ to a buffer pulsed signal $S_{buf}$ at an adjustable wavelength. The cavity 12 is further adapted to propagate and output the buffer pulsed signal $S_{buf}$ as a function of the value of the adjustable wavelength. The photodetector 14 is adapted to detect or sense an optical signal and convert the detected optical signal to an electrical signal which is an electrical representation of the detected optical signal and therefore contains the same information as that contained in the detected optical signal. In one embodiment, the electrical signal represents the amplitude in time of the detected optical signal. The photodetector 14 is further adapted to send the electrical signal to the output wavelength determining module 16. The output wavelength determining module 16 is adapted to detect the electrical signal and read the information contained therein. The output wavelength determining module 16 is further adapted to determine an output wavelength $\lambda_{out}$ from the electrical signal, i.e. from the information carried by the electrical signal. The output wavelength determining module 16 is adapted to send an electrical signal representative of the determined output wavelength $\lambda_{out}$ to the wavelength controller which controls the adjustable wavelength of the buffer pulsed signal $S_{buf}$ within the cavity 12. The operation of the time-delayed wavelength converter system 10 for converting the wavelength of a pulsed signal and delaying in time the transmission of the wavelength-converted pulsed signal is described below with respect to FIG. 2.

While the present description refers to the amplitude in time of a pulsed signal, it should be understood that the photodetector 14 may be adapted to measure the intensity in time, the power in time, etc, for the detected pulsed signal. The electrical signal outputted by the photodetector may be indicative of the amplitude, intensity, power, or the like, of the detected pulsed signal.

In one embodiment, the cavity 12 has 2R-regeneration capabilities, i.e. the cavity 12 is adapted to re-amplify and re-shape the input pulsed signal $S_{in}$ in addition to buffering the input pulsed signal $S_{in}$ and converting the wavelength of the input pulsed from the input wavelength $\lambda_{in}$ to the output wavelength $\lambda_{out}$. In another embodiment, the cavity 12 has 3R-regeneration capabilities, i.e. the cavity 12 is adapted for re-amplifying, re-shaping, and re-timing the input pulsed signal $S_{in}$ in addition to buffering the input pulsed signal $S_{in}$ and converting the wavelength of the input pulsed from the input wavelength $\lambda_{in}$, to the output wavelength $\lambda_{out}$.

Figure 2:
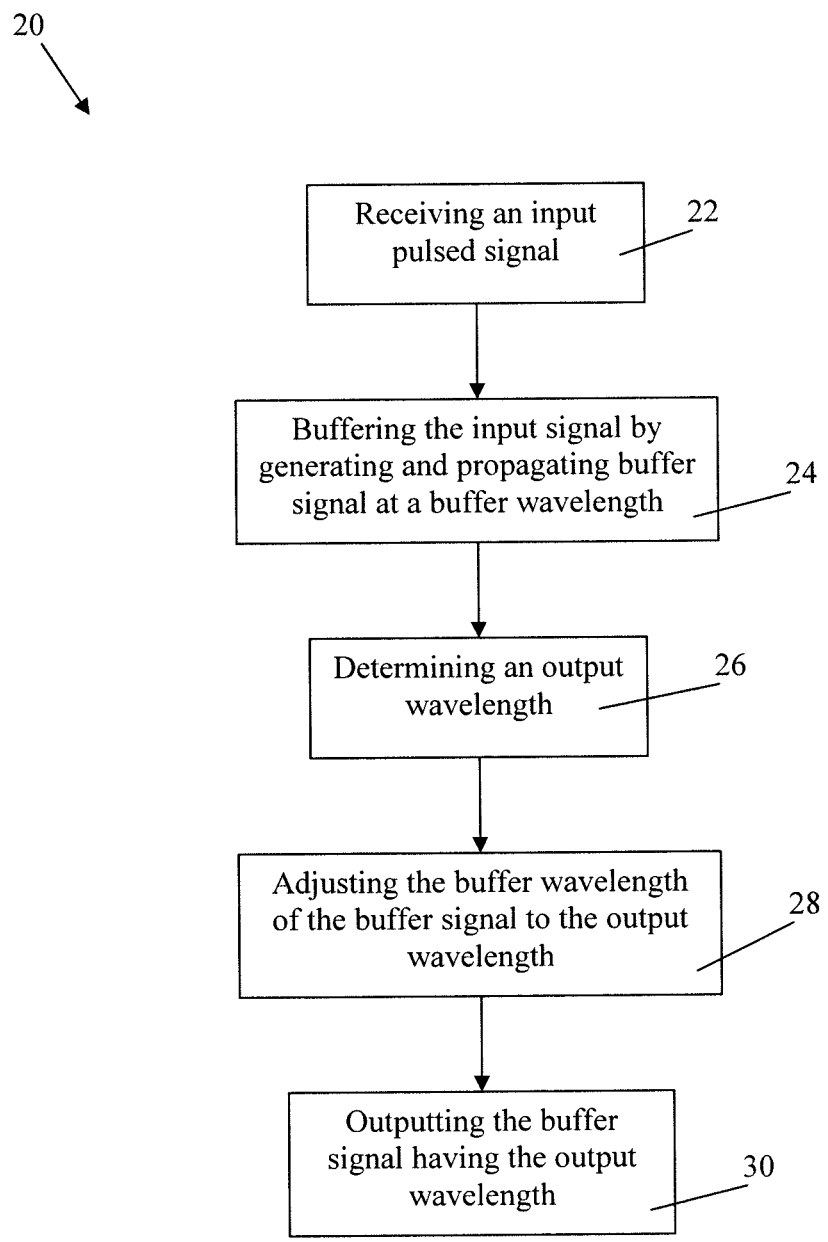
FIG. 2 is a flow chart illustrating a method of converting the wavelength of a pulsed signal, in accordance with an embodiment.

FIG. 2 illustrates one embodiment of a method 20 for converting the wavelength of a pulsed signal using the time-delayed wavelength converter system 10 of FIG. 1. The first step 22 comprises receiving an input pulsed signal $S_{in}$ having an input wavelength $\lambda_{in}$, at a time t. The input pulsed signal $S_{in}$ contains information about an output wavelength $\lambda_{out}$. As described above, the information about the output wavelength $\lambda_{out}$ may be a particular value for the output wavelength $\lambda_{out}$ or data from which the output wavelength $\lambda_{out}$ may be determined such as a network channel, a destination, and the like.

At step 24, the input pulsed signal $S_{in}$ is buffered in the cavity 12 until the output wavelength $\lambda_{out}$ encoded in the input pulsed signal $S_{in}$ be determined. The buffering of the input pulsed signal $S_{in}$ is achieved by propagating the input pulsed signal $S_{in}$ in the closed-loop optical regenerative cavity 12. The input pulsed signal $S_{in}$ at the input wavelength $\lambda_{in}$ is then converted to a buffer pulsed signal $S_{buf}$ at a buffer wavelength $\lambda_{buf}$ which propagates within the cavity 12 until the output wavelength $\lambda_{out}$ be determined. The buffer pulsed signal $S_{buf}$ contains substantially the same information as that encoded in the input pulsed signal $S_{in}$ but at the buffer wavelength $\lambda_{buf}$. The buffer wavelength $\lambda_{buf}$ is chosen to be different from the output wavelength $\lambda_{out}$.

At step 26, the output wavelength $\lambda_{out}$ is determined. This is done by first detecting the input pulsed signal $S_{in}$ using the photodetector 14. The photodetector 14 converts the optical input pulsed signal into an electrical signal which contains the same information as that contained in the optical input pulsed signal. For example, the electrical signal may represent the amplitude, intensity, or power in time of the input pulsed signal $S_{in}$. Then the electrical signal is sent to the output wavelength determining module 16.

The output wavelength determining module 16 receives the electrical signal from the photodetector 14 and determines the output wavelength $\lambda_{out}$ from the electrical signal. The wavelength controller 18 receives the determined output wavelength $\lambda_{out}$ from the output wavelength determining module 16 and adjusts the wavelength of the buffer pulsed signal $S_{buf}$ propagating in the cavity 12 from the buffer wavelength $\lambda_{buf}$ to the output wavelength $\lambda_{out}$, at step 28. At step 30, the buffer pulsed signal $S_{buf}$ having the output signal is outputted from the cavity 12, thereby generating an output pulsed signal $S_{out}$ having the output wavelength $\lambda_{out}$ and containing substantially the same information as that encoded in input pulsed signal $S_{in}$.

Following the method 20, an input pulsed signal $S_{in}$ is received by the cavity 12 at a time t and converted to a buffer pulsed signal $S_{buf}$ at a buffer wavelength $\lambda_{buf}$ containing substantially the same information as that encoded in. The buffer pulsed signal $S_{buf}$ propagates within the cavity as long as the output wavelength $\lambda_{out}$ has not been determined. Upon determination of the output wavelength $\lambda_{out}$ or after a buffering time corresponding to a desired delay, the wavelength controller 18 sets the wavelength of the buffer pulsed signal $S_{buf}$ to the output wavelength $\lambda_{out}$ and the buffer pulsed signal at the output wavelength $\lambda_{out}$ is outputted from the cavity 12 at the time t+Δt. In one embodiment, the time duration Δt corresponds to the time required for determining the output wavelength $\lambda_{out}$ and adjusting the wavelength of the buffer pulsed signal $S_{buf}$ to the output wavelength $\lambda_{out}$. During the time duration Δt, the input pulsed signal $S_{in}$ is converted to the buffer pulsed signal $S_{buf}$ which is buffered in the cavity 12. In this embodiment, the buffering time for the buffer pulsed signal $S_{buf}$ is minimized and, as soon as the output wavelength $\lambda_{out}$ has been determined, the wavelength of the buffer pulsed signal $S_{buf}$ is adjusted to the output wavelength $\lambda_{out}$ in order to output the buffer pulsed signal $S_{buf}$ at the output wavelength $\lambda_{out}$ from the cavity 12. In another embodiment, the buffer pulsed signal $S_{buf}$ may be propagated in the cavity 12 for a predetermined period of time so that the time difference between the input of the input pulsed signal $S_{in}$ and the output of the output pulsed signal $S_{out}$ substantially corresponds to a desired delay to be introduced in the propagation of the pulsed signal. In this case, the time duration Δt may be longer than the time required for detecting the input pulsed signal $S_{in}$, determining the output wavelength $\lambda_{out}$, and adjusting the wavelength of the buffer pulsed signal $S_{buf}$ to the output wavelength $\lambda_{out}$. In this embodiment, further to the determination of the output wavelength $\lambda_{out}$ (step 26) and the setting of the adjustable wavelength to the output wavelength $\lambda_{out}$ (step 28), other steps may be performed by the time-delayed wavelength converter 10 during the time duration Δt. For example, a step of verification of the value for the output wavelength $\lambda_{out}$ may be performed.

In one embodiment, the detection of the input pulsed signal $S_{in}$ with the photodetector 14 is performed before the propagation of the input pulsed signal $S_{in}$ in the cavity 12. In another embodiment, the detection of the input pulsed signal $S_{in}$ occurs substantially concurrently to the coupling of the input pulsed signal $S_{in}$ into the cavity 12. In a further embodiment, the detection of the input pulsed signal $S_{in}$ is performed after the coupling of the input pulsed signal $S_{in}$ into the cavity 12.

Figure 3A:
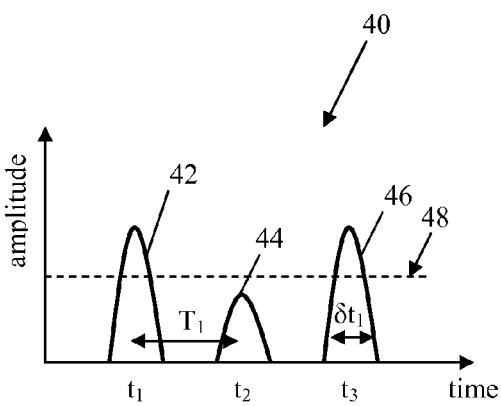
FIG. 3A illustrates an exemplary embodiment of an input pulsed signal.
Figure 3B:
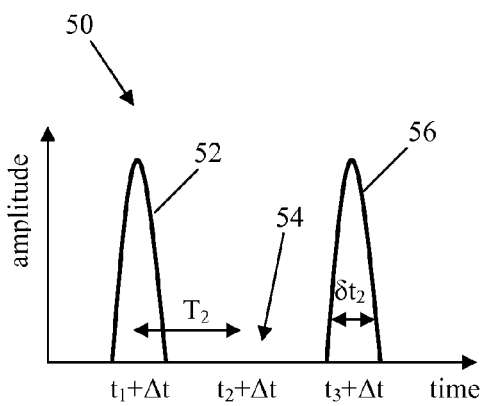
FIG. 3B illustrates an exemplary embodiment of an output pulsed signal obtained when the input pulsed signal of FIG. 3A is inputted into the time-delayed wavelength converter of FIG. 1.

FIG. 3A illustrates an example of an input pulsed signal 40 which comprises three pulses 42, 44, and 46 corresponding to a "1, 0, 1" series of bits. Pulses 42, 44, and 46 have a duration or width $\delta t_1$ and successive "0" and "1" pulses 42, 44, and 46 are spaced in time by a pulse interval $T_1$ corresponding to a first bit rate or frequency. The amplitude of pulses 42 and 46 is twice that of pulse 44, for example. FIG. 3B illustrates an example of an output pulsed signal 50 obtained when the input pulsed signal 40 is propagated into the time-delayed wavelength converter system of FIG. 1. The output pulsed signal 50 substantially contains the same information as that contained in the input pulsed signal 40, i.e. the "1, 0, 1" series of bits. The pulsed output signal 50 comprises two pulses 52 and 56 each corresponding to a "1" bit. The absence of pulse 54 at time $t_2+\Delta t$ is interpreted as a "0" bit. The pulses 52, and 56 have a duration $\delta t_2$ and the pulse interval between successive "0" and/or "1" pulses 52, 54, and 56 is $T_2$ corresponding to a second bit rate or frequency.

In an embodiment in which the cavity 12 is provided with 2R-regeneration capabilities, the input pulsed signal 40 is re-amplified and re-shaped while propagating in the cavity 12. In this case, the amplitude and duration $\delta t_2$ of the pulses 52 and 54 are set to predetermined values. For example, the input pulses 42 and 46 having an amplitude greater than a predetermined amplitude threshold 48 are converted into "1" pulses 52 and 56 having a predetermined and non-zero amplitude. The amplitude of the input pulse 44 which is below the amplitude threshold 48 is substantially set to zero. It should be understood that the amplitude and duration of the "1" pulses 52 and 56 can be any adequate value. For example, the amplitude of pulses 52 and 56 may be greater than the amplitude of pulses 42 and 46 and the pulse duration or width $\delta t_2$ can be less than that of the input pulses 42 and 46 $\delta t_1$. In one embodiment, the "1" output pulses 52 and 56 have substantially the same amplitude and duration.

In another embodiment in which the cavity is provided with 3R-regeneration capabilities, the input pulsed signal 40 is re-amplified, re-shaped, and re-timed while propagating in the cavity 12. In this case, the amplitude and duration $\delta t_2$, of the pulses 52 and 54 are set to predetermined values. In addition, any jitter present in the input pulsed signal 40 is substantially eliminated, i.e. the time interval $T_2$ between successive pulses 52, 54, and 56 is substantially constant throughout the output pulsed signal 50 and substantially corresponds to the bit rate of the input pulsed signal 40.

The skilled person will understand that errors may occur during the generation of the output pulse signal 50 so that the information contained in the output pulsed signal substantially corresponds to that contained in the input pulsed signal with an acceptable error rate. For example, a "1" bit of the input pulsed signal 40 may be reproduced as a "0" bit in the output pulsed signal 50.

In one embodiment, the time-delayed wavelength converter 10 is used as an optical switch in an optical wavelength-agile telecommunication network. In such a network, data packets are routed through channels which are each associated with a respective wavelength. The channels followed by a data packet depend on the final destination for the data packet. The data packet usually comprises information about its final destination. For example, such destination information may be included in the header of the data packet. The channels to be taken by the data packet are determined from the destination for the data packet. Because the channels are each assigned a respective wavelength, it is necessary to convert the wavelength of the optical signal carrying the data packet in order to route the data packet from one channel to another. This wavelength conversion can be achieved by the time-delayed wavelength converter 10. An input pulsed signal $S_{in}$ having an input wavelength $\lambda_{in}$ corresponding to an input channel and carrying the data packet to be transmitted to a destination is received by the time-delayed wavelength converter 10 which determines the appropriate output channel for the data packet. The output wavelength determining module determines the appropriate output channel from the destination information contained in the header of the data packet. Since each channel is associated with a corresponding wavelength, determining the output channel allows for the determination of the output wavelength $\lambda_{out}$ for the data packet. During the determination of the appropriate output wavelength $\lambda_{out}$, the time-delayed wavelength converter 10 buffers the data packet into the regenerative cavity 12 by converting the input pulsed signal $S_{in}$ to a buffer pulsed signal $S_{buf}$ having a predetermined buffer wavelength $\lambda_{buf}$ and containing substantially the same information as that encoded in the input pulsed signal $S_{in}$, and propagating the buffer pulsed signal $S_{buf}$ therein. Once the output wavelength $\lambda_{out}$ has been determined, the wavelength controller 18 sets the wavelength of the buffer pulsed signal $S_{buf}$ to the determined output wavelength $\lambda_{out}$ and the time-delayed wavelength converter 10 outputs the buffer pulsed signal $S_{buf}$ at the output wavelength $\lambda_{out}$. The pulsed signal outputted by the converter 10 carries the same information as the input pulsed signal $S_{in}$, i.e. the data packet carried by the input pulsed signal $S_{in}$. The outputted pulsed signal having the appropriate output wavelength $\lambda_{out}$ is then propagated in the appropriate channel in order to reach its final destination or another time-delayed wavelength converter 10.

In one embodiment, the length of the closed-loop regenerative cavity 12 is chosen as a function of the time interval between successive data packets arriving at the time-delayed wavelength converter 10 so that no superposition of data packets occur within the closed-loop regenerative cavity 12. For example, the length of the closed-loop regenerative cavity 12 may be chosen so that each packet only propagates one round-trip within the closed-loop regenerative cavity 12. In another embodiment, the time-delayed wavelength converter system 10 comprises a plurality of closed-loop regenerative cavities 12 and the data packets are distributed between the different closed-loop regenerative cavities 12 which are each provided with a photodetector 14, a module 16 for determining an output wavelength, and a wavelength controller 18. In this case, the time-delayed wavelength converter system 10 further comprises an optical switch for directing successive data packets to different closed-loop regenerative cavities 12. In this case, the buffering time of the data packets in at least some of the closed-loop regenerative cavities 12 may be longer than the time required for determining the output wavelength $\lambda_{out}$ or the desired predetermined delay. For example, if three closed-loop regenerative cavities 12 are used, three successive data packets are each propagated into a corresponding one of the three closed-loop regenerative cavities 12, and a priority determination may be performed during the buffering of the three data packets in order to determine which data packet has priority and should be outputted first. In this case, the two other data packet may be buffered during a duration longer than the duration required for determining their respective output wavelength.

In one embodiment, the cavity 12 is adapted to propagate therein the buffer pulsed signal $S_{buf}$ having the buffer wavelength $\lambda_{buf}$ and output the buffer pulsed signal $S_{buf}$ only when at the output wavelength $\lambda_{out}$. In this case, the buffer pulsed signal $S_{buf}$ having the buffer wavelength $\lambda_{buf}$ cannot exit the cavity. In another embodiment, part of the buffer pulsed signal $S_{buf}$ at the buffer wavelength $\lambda_{buf}$ exits the cavity 12 at each round-trip.

In one embodiment, the cavity 12 is adapted to output the buffer pulsed signal $S_{buf}$ at the output wavelength $\lambda_{out}$ while preventing the buffer pulsed signal $S_{buf}$ at the output wavelength $\lambda_{out}$ from propagating in the cavity 12. In this case, the buffer pulsed signal $S_{buf}$ at the output wavelength $\lambda_{out}$ propagates less than one round-trip in the cavity before exiting the cavity 12.

It should be understood that the cavity 12 may be any optical cavity adapted to receive an input pulsed optical signal at an input wavelength $\lambda_{in}$, convert the input pulsed signal $S_{in}$ to a buffer pulsed signal $S_{buf}$ at an adjustable wavelength, and propagate therein and output the buffer pulsed signal $S_{buf}$ as a function of the value of the adjustable wavelength.

In one embodiment, the output wavelength determining module 16 comprises a processing unit adapted to read the electrical signal to determine the information contained therein and determine the output wavelength value from the information. In one embodiment, the output processing unit is adapted to determine a destination from the information contained in the electrical signal and assign a value for the output wavelength as a function of the determined destination.

Figure 4:
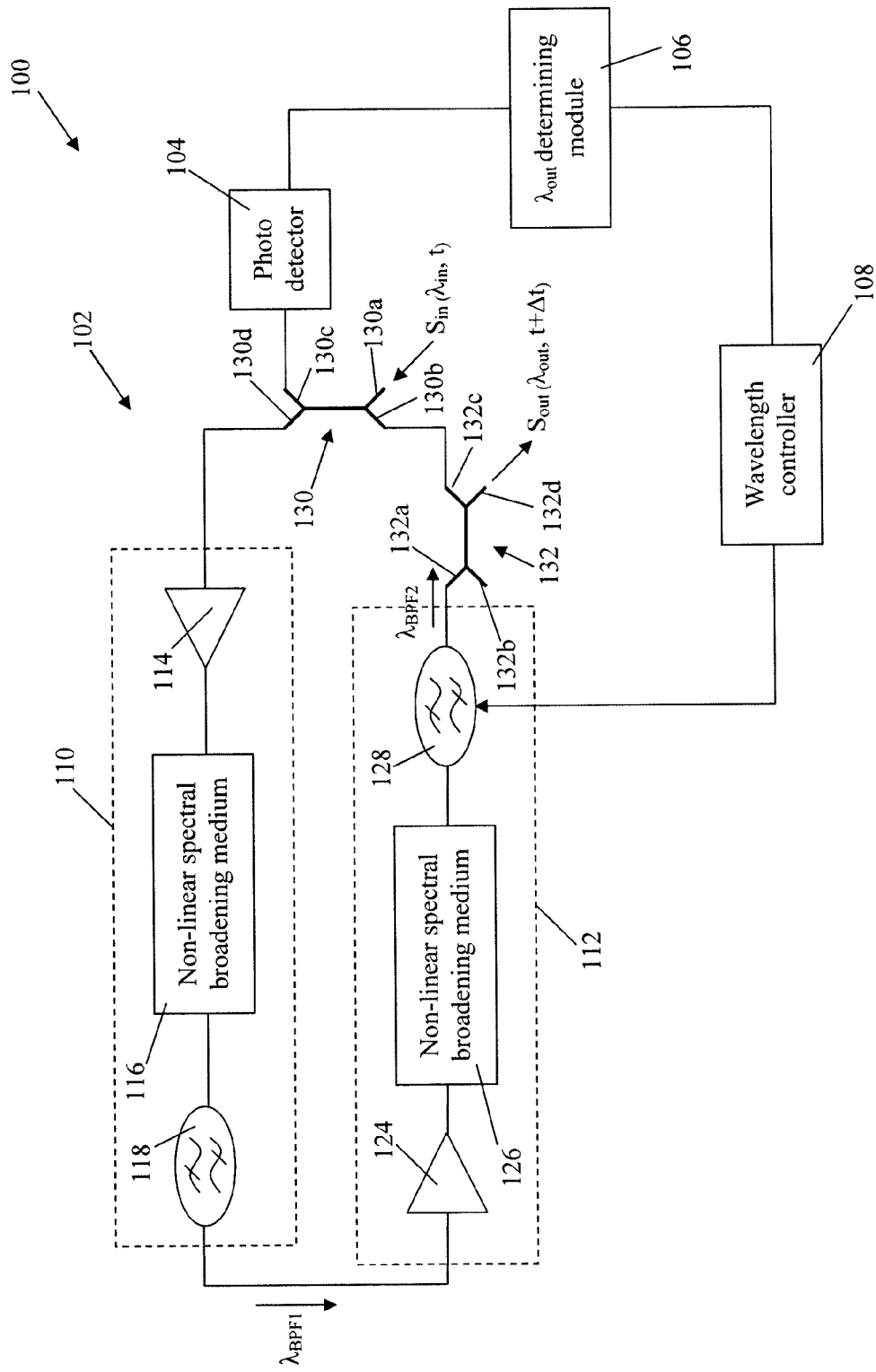
FIG. 4 illustrates a time-delayed wavelength converter comprising two optical regenerators each having a respective nonlinear spectral broadening medium, in accordance with an embodiment.

FIG. 4 illustrates one embodiment of a time-delayed wavelength converter 100 which comprises a closed-loop regenerative optical cavity 102, a photodetector 104, an output wavelength determining module 106, and a wavelength controller 108. The closed-loop generative optical cavity 102 comprises a pair of cascaded optical 2R-regenerators 110 and 112 optically connected together in a closed-loop configuration.

The optical regenerator 110 comprises an optical amplifier 114, a nonlinear spectral broadening medium 116, and a bandpass filter 118 which are connected together so that the amplifier 114 and the bandpass filter 118 be positioned respectively upstream and downstream from the nonlinear spectral broadening medium 116. An optical signal received by the first regenerator 110 is first amplified by the amplifier 114 before being spectrally broadened by the nonlinear spectral broadening medium 116. The spectrally broadened signal is then spectrally filtered by the bandpass filter 118, thereby providing a filtered signal having a wavelength corresponding to the central wavelength of the bandpass filter 118, i.e. $\lambda_{BPF1}$.

The optical regenerator 112 comprises an optical amplifier 124, a nonlinear spectral broadening medium 126, and an adjustable bandpass filter 128 which are optically connected together so that the second amplifier 124 and the second bandpass filter 128 be respectively positioned upstream and downstream from the second nonlinear spectral broadening medium 126. The central wavelength $\lambda_{BPF2}$ of the bandpass filter 128 is adjustable so that the second regenerator 112 outputs a signal having an adjustable wavelength $\lambda_{BPF2}$. The output of the bandpass filter 118 of the first regenerator 110 is connected to the input of the amplifier 124 of the second regenerator 112 so that the filtered signal at the wavelength $\lambda_{BPF1}$ be coupled into the second regenerator 112. The signal at the wavelength $\lambda_{BPF1}$ is first amplified by the amplifier 124, then spectrally broadened by the nonlinear spectral broadening medium 126, and spectrally filtered by the bandpass filter 128. The output of the second regenerator 112 is a signal having a wavelength corresponding to the central wavelength of the adjustable bandpass filter 128, i.e. $\lambda_{BPF2}$.

The closed-loop regenerative optical cavity 102 further comprises an input coupler 130 for coupling an input pulsed signal $S_{in}$ into the cavity 102 and an output coupler 132 for outputting an output pulsed signal $S_{out}$ from the cavity 102. Each coupler 130 and 132 comprises two inputs 130a and 130b, and 132a and 132b, respectively, and two outputs 130c and 130d, and 132c and 132d, respectively. The input 130a of the coupler 130 is used for receiving the input pulsed signal $S_{in}$. The output 130c of the coupler 130 is connected to the photodetector 104 while the other output 130d is connected to the first regenerator 110, i.e. the input of the amplifier 114. The input 132a of the coupler 132 is connected to the output of the second regenerator 112, i.e. the output of the second bandpass filter 128. The output 132c of the coupler 132 is connected to the input 130b of the first coupler 130 while the output 132d of the coupler 82 is used for outputting the output signal $S_{out}$.

As a result of the above described connections between the regenerators 110 and 112 and the couplers 130 and 132, an input signal $S_{in}$ having an input wavelength $\lambda_{in}$ and containing information about an output wavelength $\lambda_{out}$ is received by the input 130a of the coupler 130 at a time t and converted to an output pulsed signal $S_{out}$ which is outputted at a time t+Δt and contains substantially the same information as that encoded in the input pulsed signal $S_{in}$. Part of the input pulsed signal $S_{in}$ received by the input 130a of the coupler 130 is directed towards the photodetector 104 while the remaining of the input pulsed signal $S_{in}$ is transmitted to the first regenerator 110. The photodetector 104 detects the input pulsed signal $S_{in}$ and transmits an electrical signal representative of the input pulsed signal $S^{in}$ to the output wavelength determining module 106 which determines the output wavelength $\lambda_{out}$ from the received electrical signal. The determined output wavelength $\lambda_{out}$ is then transmitted to the wavelength controller 108 which adjusts the central wavelength of the adjustable bandpass filter 128 to the output wavelength $\lambda_{out}$.

The pulsed signal received by the first regenerator 110 from the output 130d of the coupler 130 is converted to a signal at the central wavelength of the bandpass filter 118, i.e. $\lambda_{BPF1}$. The signal at $\lambda_{BPF1}$ is sent into the second regenerator 112 which outputs a signal at the central wavelength of the adjustable bandpass filter 128, i.e. $\lambda_{BPF2}$. Part of the signal at $\lambda_{BPF2}$ outputted by the second regenerator 112 is outputted from the cavity 102 via the output 132d of the second coupler 132 while the remaining of this signal is directed towards the input 130b of the first coupler 130.

The cavity 102 has at least three operational modes depending on the filter offset (FO) between the bandpass filter 118 and 128, i.e. depending on the difference between the central wavelengths $\lambda_{BPF1}$ and $\lambda_{BPF2}$ for the bandpass filter 118 and 128, respectively.

For FO comprised between zero and a first threshold value, the cavity 102 operates in a continuous-wave (CW) mode. In this mode, the signal outputted by the cavity 102 is a CW signal at $\lambda_{BPF2}$, and therefore the information contained in the input pulsed signal $S_{in}$ is lost.

For FO comprised between the first threshold value and a second threshold value, the cavity 102 operates in a self-pulsating mode. In this case, the signal at $\lambda_{BPF2}$ outputted by the cavity 102 is a pulsed signal of which the characteristics are unrelated to those of the input pulsed signal $S_{in}$. The characteristics of pulses of the pulsed output signal $S_{out}$ depends only on the characteristics of the cavity 102. For example, the time spacing between successive pulses of the output signal $S_{out}$ may be different from that of the input pulsed signal $S_{in}$, the amplitude of the pulses of the output signal may be unrelated to that of the pulses of the input pulsed signal $S_{in}$, and/or the duration of the pulses of the output pulsed signal $S_{out}$ may be different from that of the input pulsed signal $S_{in}$. Therefore, the information comprised in the input pulsed signal $S_{in}$ is lost.

For FO comprised between the second threshold value and a third threshold value, the cavity 102 operates in a pulse-buffering (PB) mode. The two regenerators 110 and 112 which each comprise an amplifier 114 and 124, a nonlinear spectral broadening medium, 116 and 126, and a bandpass filter 118 and 128 each allow for re-amplification and re-shaping of an incoming pulse. The two regenerators 110 and 112 generate a nonlinear power transfer function for the cavity 102, which acts as a pulse shaper and stabilizer. As a result, the cavity 102 supports eigenpulses, i.e. pulses that are substantially identical at the input of the first regenerator 110 and the output of the second regenerator 112. The eigenpulses are regenerated twice per cavity round-trip which provides them with a profile, a group velocity, and a relative spacing in time that remain substantially stable over time. As a result, the cavity 102 operated in the PB mode supports the oscillation of pulses that are injected therein, thereby buffering the injected pulses.

In one embodiment, the operation parameters including the bandwidth of the bandpass filter 128 are chosen such that the pulse duration of the output signal $S_{out}$ is substantially equal to that of the input signal $S_{in}$. In another embodiment, the operation parameters are chosen such that the pulse duration of the input and output signals are different. Similarly, the operation parameters can be chosen such that the amplitudes of the pulses of the input and output signals are substantially identical or different.

Therefore, by setting the central wavelength $\lambda_{BPF1}$ of the bandpass filter 118 to a predetermined wavelength adequately chosen as a function of a predefined range of possible values for the output wavelength $\lambda_{out}$, the cavity 102 operates in the PB mode and the pulsed signal outputted by the bandpass filter 128 is substantially identical to the input pulsed $S_{in}$ for a particular range of wavelength $\lambda_{BPF2}$, i.e. the PB wavelength range. The PB wavelength range includes the predefined range of possible values for the output wavelength $\lambda_{out}$. A value for a buffer wavelength $\lambda_{buf}$ is chosen so as to be comprised within the PB wavelength range but outside of the range of possible values for the output wavelength $\lambda_{out}$. As a result, the time-delayed wavelength converter 100 operates as follows.

Figure 5:
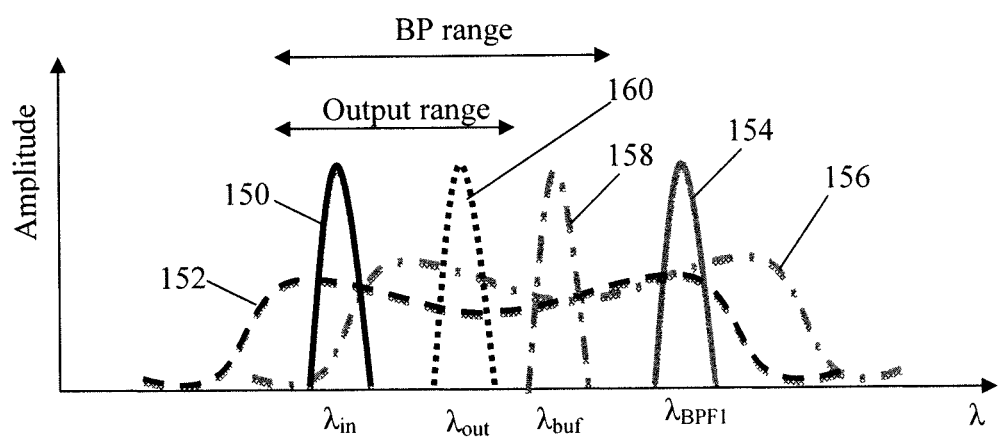
FIG. 5 is an exemplary graph of an amplitude of pulses as a function a wavelength.

Referring to FIGS. 4 and 5, the central wavelength $\lambda_{BPF2}$ of the bandpass filter 128 is set to the buffer wavelength $\lambda_{buf}$ and an input pulsed signal 150 at the input wavelength $\lambda_{in}$ enters the cavity 102 which is operated in the PB mode. The input pulsed signal 150 is amplified and broadened by the amplifier 114 and the spectrally broadening medium 116, respectively, to generate a broadened signal 152. The broadened signal 152 is filtered by the bandpass filter 118 to generate a signal 154 at the predetermined central wavelength $\lambda_{BPF1}$. The signal at $\lambda_{BPF1}$ is inputted into the second generator 112 where it is amplified and broadened by the amplifier 124 and the spectrally broadening medium 126, respectively, to generate a broadened signal 156. The broadened signal 156 is filtered by the bandpass filter 128 to generate a buffer pulsed signal $S_{buf}$ at the buffer wavelength $\lambda_{buf}$. The buffer wavelength $\lambda_{buf}$ is included in the PB range of wavelength allowing the operation of the cavity 102 in the PB mode, but outside of the range of possible values for the output wavelength $\lambda_{out}$. Since the cavity 102 operates in the PB mode, the buffer pulsed signal 158 is substantially identical to the input pulsed signal 150. The buffer pulsed signal 158 then enters the first regenerator 110 via the couplers 130 and 132 to generate the signal 154 at $\lambda_{BPF1}$. The signal 154 propagates through the second regenerator 112 to generate the buffer pulsed signal 158 at $\lambda_{buf}$. The buffer pulsed signal 158 at $\lambda_{buf}$ propagates within the cavity 102 during the determination of the output wavelength $\lambda_{out}$. Upon reception of the determined output wavelength $\lambda_{out}$ from the output wavelength determining module 106, the wavelength controller 108 adjusts the central wavelength $\lambda_{BPF2}$ of the adjustable bandpass filter 128 from the buffer wavelength $\lambda_{buf}$ to the output wavelength $\lambda_{out}$. The buffer pulsed signal having the output wavelength $\lambda_{out}$ then corresponds to the output pulsed signal 160 which is substantially identical to the input pulsed signal 150 and outputs the cavity 112 via the output 132d of the coupler 132.

In one embodiment, the coupler 132 is a power or tap coupler splitting the buffer pulsed signal $S_{buf}$ between the outputs 132c and 132d. In this case, the cavity 102 may further comprise a spectral filter positioned downstream of the coupler 132. The spectral filter allows the buffer pulsed signal $S_{buf}$ to propagate therethrough when at the buffer wavelength $\lambda_{buf}$, but prevents the propagation of the buffer pulsed signal $S_{buf}$ in the cavity 102 when at the output wavelength $\lambda_{out}$. Alternatively, the amplifiers 114 and 124 may be shut down once the buffer pulsed signal $S_{buf}$ at the output wavelength $\lambda_{out}$ has outputted the cavity 102 so that no buffer pulsed signal $S_{buf}$ at the output wavelength $\lambda_{out}$ propagates in the cavity 102. The cavity 102 may also comprise a spectral filter preventing the propagation of a signal at the buffer wavelength $\lambda_{buf}$ and positioned at the output 132d of the coupler 132, so that only the buffer pulsed signal $S_{buf}$ having the output wavelength $\lambda_{out}$ may exit the converter 100.

In another embodiment, the coupler 132 can be a wavelength-division multiplexing (WDM) coupler adapted to transmit all of the buffer pulsed signal $S_{buf}$ at the output wavelength $\lambda_{out}$ from the input 132a to the output 132d so that no buffer pulsed signal $S_{buf}$ at the output wavelength $\lambda_{out}$ can propagate in the cavity 102. The WDM coupler 132 may also be designed so that the entire buffer pulsed signal $S_{buf}$ at the buffer wavelength $\lambda_{buf}$ is transmitted from the input 132a to the output 132c so that no buffer pulsed signal $S_{buf}$ at the buffer wavelength $\lambda_{buf}$ exits the cavity 102. Alternatively, the cavity 102 may comprise a spectral filter preventing the propagation of a signal at the buffer wavelength $\lambda_{buf}$ and positioned at the output 132d of the coupler 132.

It should be understood that the position of the couplers 130 and 132 within the cavity 102 is exemplary only. The couplers 130 and 132 may be positioned at any adequate locations within the cavity 102 as long as the coupler 130 is positioned upstream of the broadening medium 116 and the coupler 132 is positioned downstream of the adjustable bandpass filter 128. For example, the couplers 130 and 132 may be positioned between the amplifier 114 and the broadening medium 116.

While the photodetector 104 is connected to the output 130c of the coupler 130 in order to detect the input pulsed signal $S_{in}$, it should be understood that other configurations are possible. For example, the photodetector may be connected to a waveguide used for propagating the input pulsed signal up to the input 130a of the coupler 130. In this case, the input pulsed signal $S_{in}$ is detected by the photodetector 104 before entering the cavity 102. When the photodetector 104 is so positioned, the coupler 130 may be replaced by an optical Y-junction comprising two inputs and a single output and adapted to transmit the entire input pulsed signal $S_{in}$ received at one input and the entire buffer pulsed signal $S_{buf}$ received at the other input to the output.

While the amplifiers 114 and 124 have an upstream position in the regenerator 110 and 112, it should be understood that other configurations are possible as long as the bandpass filters 118 and 128 are positioned downstream of their respective spectrally broadening medium 116 and 126. For example, the amplifier 114 may be positioned between the spectrally broadening medium 116 and the bandpass filter 118 while the amplifier 124 may be positioned between the bandpass filter 128 and the output coupler 132.

It should be understood that any adequate optical amplifier, nonlinear spectral broadening medium, and bandpass filter may be used. For example, the amplifier 114 and 124 may be an optical fiber amplifier such as an Erbium-doped fiber amplifier (EDFA), a fiber Raman amplifier, and the like. Alternatively, the amplifier 114, 124 can be a semiconductor optical amplifier (SOA). The nonlinear spectral broadening medium 116, 126 can be a highly nonlinear fiber (HNLF) in which an optical pulse experiences self-phase modulation (SPM) spectral broadening, a photonic crystal, and the like. While the bandpass filter 128 is tunable, i.e. the central wavelength $\lambda_{BPF2}$ is adjustable, the bandpass filter 118 may have a fixed and predetermined central wavelength $\lambda_{BPF1}$. Alternatively, the bandpass filter 118 may also be tunable. Examples of adequate optical bandpass filter comprise a thin film bandpass filter, a micro-electro-mechanical system (MEMS) filter, a fiber Bragg grating (FBG) connected to the cavity via an optical circulator.

It should be understood that the wavelength controller 108 is adapted to the type of tunable bandpass filter used in the cavity. For example, if the tunable bandpass filter is a MEMS filter, the wavelength controller is adapted to send an electrical signal having an adequate voltage and/or current for controlling the MEMS filter. The MEMS filter may comprise a diffractive crystal and a motor for rotating the crystal. In this case, the wavelength controller is adapted to control the position of the motor in order to adjust the central wavelength of the MEMS filter. In another example, the tunable bandpass filter is a FBG and the wavelength controller is adapted to control the wavelength reflected by the FBG. In this case, the wavelength controller may be adapted to control the temperature of the FBG in order to adjust the reflected wavelength to a desired value.

Alternatively, the wavelength controller can be adapted to stretch the FBG to adjust the reflected wavelength.

Figure 6:
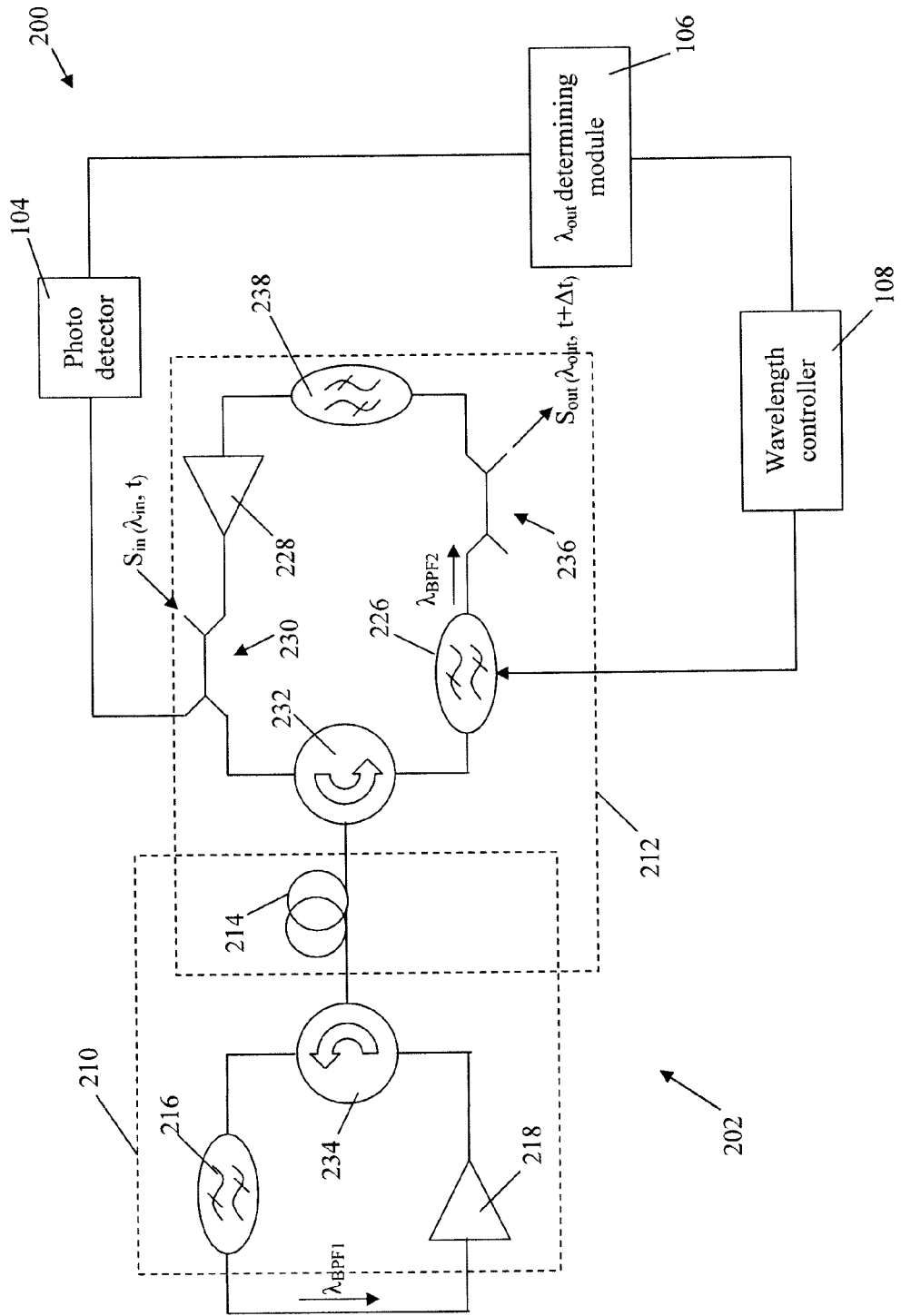
FIG. 6 illustrates a time-delayed wavelength converter comprising two optical regenerators sharing a same nonlinear spectral broadening medium, in accordance with an embodiment.

FIG. 6 illustrates a time-delayed wavelength converter 200 comprising a single nonlinear spectral broadening medium. The converter 200 comprises an optical regenerative cavity 202, a photodetector 104, an output wavelength determining module 106, and a wavelength controller 108. The cavity 202 comprises two optical 2R-regenerators 210 and 212 which are connected together in a closed-loop configuration and share a same nonlinear spectral broadening medium, i.e. a HNLF 214. The optical regenerator 210 comprises the HNLF 214, a bandpass filter 216 having a central wavelength $\lambda_{BPF1}$, and an optical amplifier 218. The optical regenerator 212 comprises the HNLF 214, a tunable bandpass filter 226 having a central wavelength $\lambda_{BPF1}$ and an optical amplifier 228.

An optical coupler 230 is used for inputting the input pulsed signal $S_{in}$ into the cavity 202. The coupler 230 is a tap coupler having one output connected to the photodetector 104 and another output connected an optical circulator 232. The circulator 232 is also connected to the HLNF 214 and the bandpass filter 226 so that a signal coming from the coupler 230 is directed towards the HNLF 214 and a signal coming from the HNLF 214 is directed towards the tunable bandpass filter 226. A second optical circulator 234 connects the HNLF 214 to the bandpass filter 216 and the optical amplifier 218 so that a signal propagating from the HNLF 214 is directed towards the bandpass filter 216 and a signal coming from the amplifier 218 is directed towards the HNLF 214.

An output coupler 236 is positioned downstream from the tunable bandpass filter 226 in order to output an output signal $S_{out}$ at an output wavelength $\lambda_{out}$ from the cavity 202. A third bandpass filter 238 adapted to prevent a signal having the output wavelength $\lambda_{out}$ out from propagating within the cavity 202 is connected between the coupler 236 and the amplifier 228. It should be understood that the third bandpass filter 238 may be replaced by any adequate passive or active spectral filter device which allows a signal having the buffer wavelength $\lambda_{buf}$ to propagate therethrough while preventing a signal having the output wavelength $\lambda_{out}$ to propagate therethrough. For example, a switch, a variable attenuator, a modulator, an electro-optic filter, or the like may be used. Alternatively, the converter 200 may comprise no third bandpass filter 238. In this case, at least one of the amplifiers 218 and 228 is stopped once the output signal $S_{out}$ exited the converter 200.

As described above, by adequately choosing the values for the wavelength $\lambda_{BPF1}$ of the bandpass filter 216 and the buffer wavelength $\lambda_{buf}$ as a function of the range of possible values for the output wavelength $\lambda_{out}$, the converter 200 can convert an input pulsed signal $S_{in}$ at an input wavelength $\lambda_{in}$ to a buffer pulsed signal $S_{buf}$ at the buffer wavelength $\lambda_{buf}$, buffer the buffer pulsed signal $S_{buf}$ during the determination of the output wavelength $\lambda_{out}$ by propagating the buffer pulsed signal $S_{buf}$ within the cavity 202, convert the wavelength of the buffer pulsed signal $S_{buf}$ from the buffer wavelength $\lambda_{buf}$ to the output wavelength $\lambda_{out}$ upon determination of the output wavelength $\lambda_{out}$, and output the buffer pulsed signal $S_{buf}$ at the output wavelength $\lambda_{out}$, thereby generating an output pulsed signal $S_{out}$ substantially identical to the input pulsed signal $S_{in}$.

In one embodiment, a further bandpass filter (not shown) may be connected at the output of the coupler 236 in order to prevent the buffer pulsed signal $S_{buf}$ at the buffer wavelength $\lambda_{buf}$ from exiting the converter 200.

In one embodiment, the HNLF 214 has the following characteristics: length=1007 m; chromatic dispersion at 1550 nm=−0.71 ps/nm-km; second order chromatic dispersion=0.01 ps/nm²-km; and nonlinearity coefficient=11.5 $W^{-1}$-$km^{-1}$. The amplifiers 218 and 228 are EDFAs which provide a gain adapted to compensate for the losses within the cavity 200 so that a signal outputted by a regenerator 210, 212 has substantially the same power as a signal entering the regenerator. The bandpass filter 216 and 226 have each a full width at half maximum (FWHM) of about 0.39 nm and a substantially squared Lorentzian overall profile. It should be understood that the amplitude of the pulses of the output signal may be different from that of their respective pulses of the input signal. In this case, an amplifier or an attenuator may be positioned at the output of the optical regenerative cavity 202 to obtain a desired pulse amplitude for the output signal.

The range of possible values for the input wavelength $\lambda_{in}$ and the output wavelength $\lambda_{out}$ is identical and set to [1522 nm-1528 nm]. By setting the central wavelength $\lambda_{BPF1}$ of the bandpass filter 216 to about 1529.9 nm, the cavity 202 has the following modes: CW mode for FO=$\lambda_{BPF1}$−$\lambda_{BPF2}$ comprised between zero and 1 nm, i.e. $\lambda_{BPF2}$ comprised between 1528.9 nm and 1529.9 nm; SP mode for FO comprised between 1 nm and 1.2 nm i.e. $\lambda_{BPF2}$ comprised between 1528.7 nm and 1528.9 nm; PB mode for FO comprised between 1.2 nm and 10.5 nm, i.e. $\lambda_{BPF2}$ comprised between 1519.4 nm and 1528.7 nm. Therefore, the cavity 202 operates in the PB mode for the range of possible values for the output wavelength $\lambda_{out}$.

For example, the buffer wavelength $\lambda_{buf}$ is set to about 1520 nm which is comprised within the range of values for $\lambda_{BPF2}$ allowing the PB mode of operation of the cavity 202 but outside of the range of values for the output wavelength $\lambda_{out}$. In this case, the converter 200 can receive an input pulsed signal $S_{in}$ at an input wavelength $\lambda_{in}$, having any value comprised between 1522 nm and 1528 nm such as 1524.2 nm for example, convert the input pulsed signal $S_{in}$ at 1524.2 nm to a substantially identical buffer pulsed signal $S_{buf}$ at 1520 nm, determine the value of the output wavelength $\lambda_{out}$ such as 1526.4 nm for example, adjust the wavelength of the buffer pulsed signal $S_{buf}$ from the 1520 nm to 1526.4 nm, and output the buffer pulsed signal $S_{buf}$ at 1526.4 nm.

Figure 7:
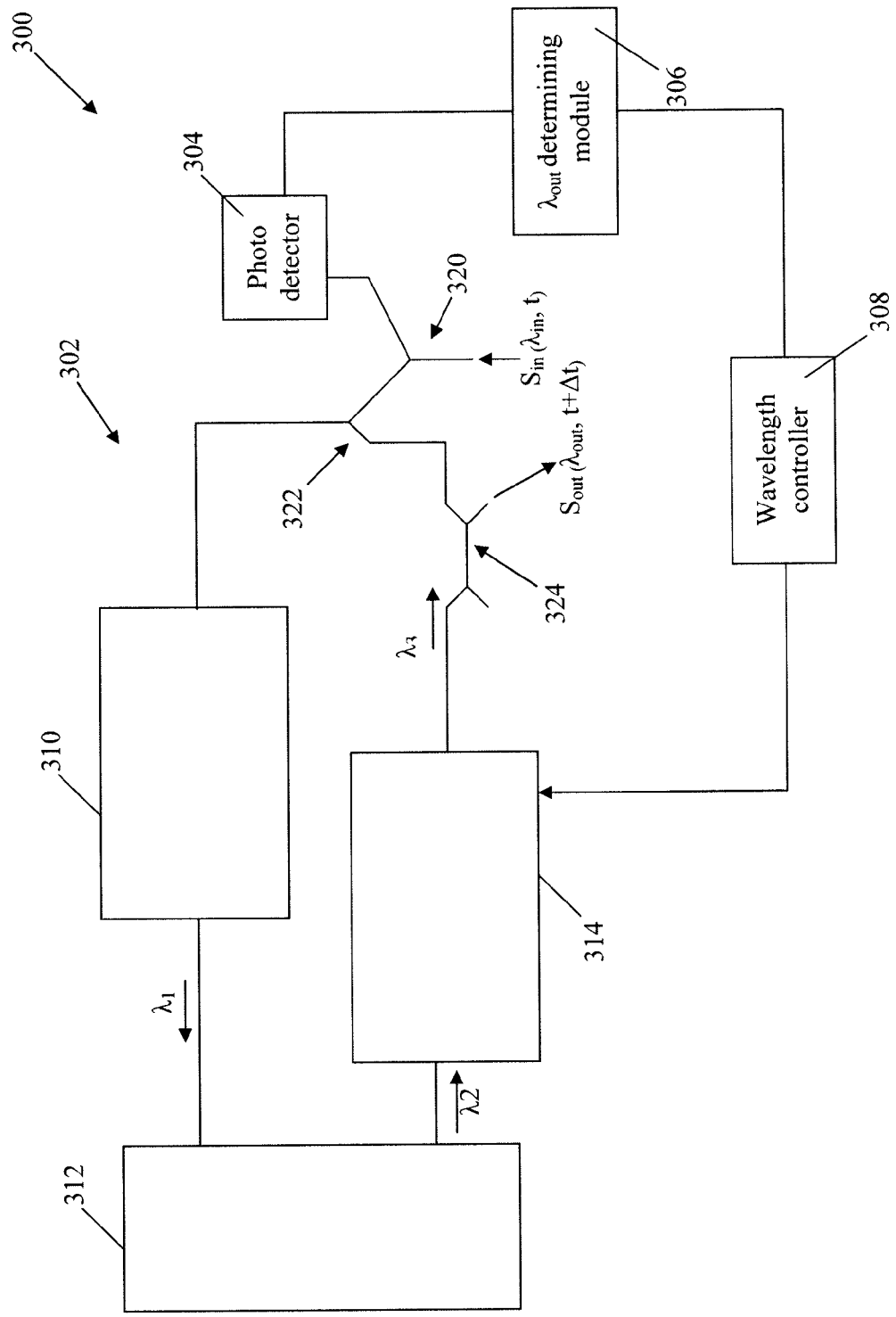
FIG. 7 illustrates a time-delayed wavelength converter comprising three optical regenerators connected together in a closed-loop configuration, in accordance with an embodiment.

While the converters 100 and 200 each comprise two optical regenerators 110 and 112, and 210 and 212, respectively, it should be understood that a time-delayed wavelength converter may comprise more than two optical regenerators connected together in a closed-loop configuration. FIG. 7 illustrates one embodiment of a time-delayed wavelength converter 300 adapted to receive an input pulsed signal $S_{in}$ at an input wavelength $\lambda_{in}$ and output an output pulsed signal $S_{out}$ at an output wavelength $\lambda_{out}$ which contains substantially the same information as that encoded in the input pulsed signal $S_{in}$.

The converter 300 comprises an optical regenerative cavity 302, a photodetector 304, an output wavelength determining module 306, and a wavelength controller 308. The cavity 302 comprises three optical regenerators 310, 312, and 314 connected together. The regenerators 310, 312, and 314 are each adapted to receive an incoming signal at a first wavelength and output a signal at a different wavelength, i.e. $\lambda_1$, $\lambda_2$, and $\lambda_3$, respectively. The wavelength $\lambda_3$ of the signal generated by the third regenerator 314 is tunable.

Part of the input pulsed signal $S_{in}$ is sent to the photodetector 304 via a first Y-junction 320 while the remaining of the input pulsed signal $S_{in}$, is sent to a second Y-junction 322. The second Y-junction 322 comprises two inputs of which one is connected to an output of the first Y-junction 320, and a single output. The second Y-junction 322 is adapted to transmit substantially the entire signal received at each one of the two inputs to the output. The second Y-junction 322 +is used for propagating the input pulsed signal $S_{in}$ up to the first optical regenerator 310 which converts the input signal to a signal at $\lambda_1$. The signal at $\lambda_1$ is coupled into the second optical regenerator 312 which generates a signal at $\lambda_2$. The signal at $\lambda_2$ is inputted into the third regenerator 314 in order to generate a signal at $\lambda_3$. The wavelength controller 308 is adapted to control the wavelength $\lambda_3$ of the signal generated by the third regenerator 314. An output coupler 324 is positioned downstream from the third optical regenerator 314 for outputting the output pulsed signal $S_{out}$ at the output wavelength $\lambda_{out}$. The coupler 324 has an output connected to the other input of the Y-junction 322 for propagating the signal at $\lambda_3$ up to the first regenerator 310.

By adequately choosing the values for the wavelengths $\lambda_1$ and $\lambda_2$ for the first and second regenerators 310 and 312 and a buffer wavelength $\lambda_{buf}$ as a function of the range of possible values for the output wavelength $\lambda_{out}$, the converter 300 can convert an input pulsed signal $S_{in}$ at an input wavelength $\lambda_{in}$ to a buffer pulsed signal $S_{buf}$ at the buffer wavelength $\lambda_{buf}$, buffer the buffer pulsed signal $S_{buf}$ during the determination of the output wavelength $\lambda_{out}$ by propagating the buffer pulsed signal $S_{buf}$ at the buffer wavelength $\lambda_{buf}$ within the cavity 302, convert the wavelength of the buffer pulsed signal $S_{buf}$ from the buffer wavelength $\lambda_{buf}$ to the output wavelength $\lambda_{out}$ upon determination of the output wavelength $\lambda_{out}$, and output the buffer pulsed signal $S_{buf}$ at the output wavelength $\lambda_{out}$, thereby generating an output pulsed signal $S_{out}$ substantially identical to the input pulsed signal $S_{in}$.

Using the converter 10, 100, 200, and 300, it is possible to both convert an input signal at an input wavelength to an output signal at an output wavelength which contains substantially the same information as that encoded in the input pulsed signal $S_{in}$, and introduce a delay line in the transmission of the output signal using a single device, namely the regenerative cavity 12, 102, 202, and 302.

While the time-delayed wavelength converter systems described above only offers 2R-regeneration, i.e. they comprise at least two optical 2R-regenerators optically connected together in a closed-loop configuration, it should be understood that the time-delayed wavelength converter system may also provide for 3R-regeneration, i.e. the system allows for re-amplifying, re-shaping, and re-timing the input signal in addition to converting the wavelength of an input signal. In this case, the system comprises at least one optical 3R-regenerator. For example, the system may comprise one optical 3R-regenerator and at least one optical 2R-regenerator. In another embodiment, the system may comprise at least two optical 3R-regenerators.

Figure 8:
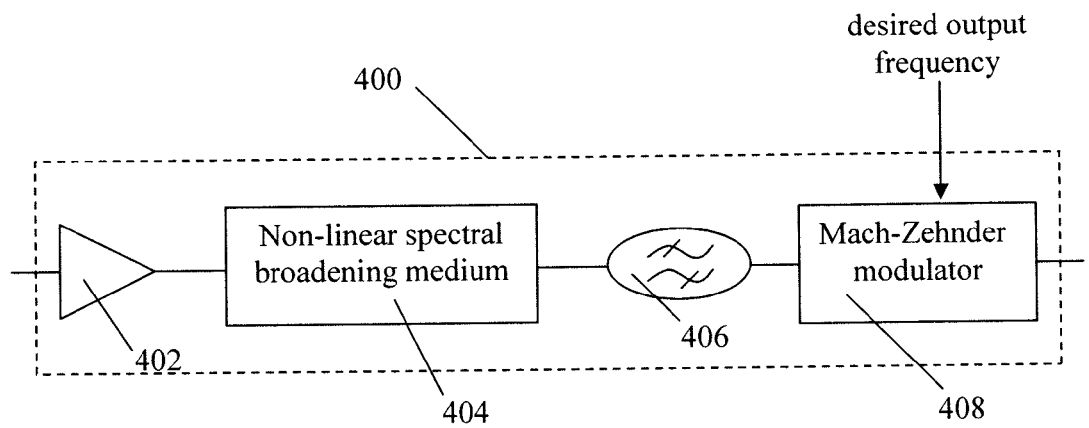
FIG. 8 illustrates an optical 3R-regenerator for use in a time-delayed wavelength converter, in accordance with a first embodiment.

FIG. 8 illustrates one embodiment of an adequate optical 3R-regenerator 400 which comprises an optical amplifier 402, a non-linear spectral broadening medium 404, a bandpass filter 406, and a Mach-Zehnder modulator 408 for retiming the input pulsed signal so that the output pulsed signal be at a desired frequency or bit rate. The Mach-Zehnder modulator 408 is adjusted at the desired frequency by receiving a clock signal having the desired frequency in order to resynchronize the output signal. It should be understood that the Mach-Zenhder modulator 408 may be replaced by any adequate optical modulator such as an electro-absorption modulator, an acousto-optic modulator, or the like.

Figure 9:
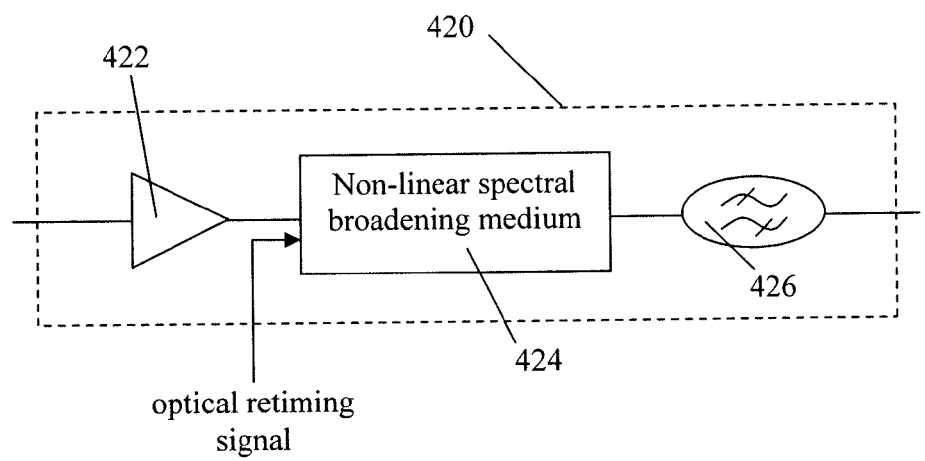
FIG. 9 illustrates an optical 3R-regenerator for use in a time-delayed wavelength converter, in accordance with a second embodiment.

FIG. 9 illustrates another embodiment of an adequate optical 3R-regenerator 420 which comprises an optical amplifier 422, a non-linear spectral broadening medium 424, and a bandpass filter 426. The retiming is performed by modulating the non-linearity of the nonlinear spectral broadening medium 424 to obtain cross-phase modulation (XPM) therein. The modulation of the non-linearity of the HLNF 424 is done by propagating a pulsed retiming signal having a wavelength different from that of the input, output, and buffer signals in the HNLF and having a pulse frequency equal to that of the desired frequency for the output signal. The wavelength of the retiming signal is chosen to be adequately offset from the output in order to transmit only XPM generated frequencies.

The embodiments described above are intended to be exemplary only. The scope of the invention is therefore intended to be limited solely by the scope of the appended claims.

We claim:

1. A method for converting a wavelength of an optical pulsed signal to an output wavelength, the method comprising:
   receiving an input pulsed signal containing information encoded therein and having an input wavelength;
   buffering the input pulsed signal by propagating the input pulsed signal in a closed-loop optical regenerative cavity, said propagating comprising:
      converting the input pulsed signal at the input wavelength to an intermediary pulsed signal at a predetermined wavelength; and
      repeatedly converting the intermediary pulsed signal at the predetermined wavelength to a buffer pulsed signal at an adjustable wavelength, and converting the buffer pulsed signal at the adjustable wavelength to the intermediary pulsed signal at the predetermined wavelength, the adjustable wavelength being set to a buffer wavelength different from the output wavelength and the buffer pulsed signal containing the information encoded in the input pulsed signal;
   determining the output wavelength from the information encoded in the input pulsed signal;
   upon said determining the output wavelength, setting the adjustable wavelength of the buffer pulsed signal to the output wavelength; and
   outputting the buffer pulsed signal at the output wavelength from the cavity, thereby obtaining an output pulsed signal having the output wavelength and containing the information encoded in the input pulsed signal.

2. The method of claim 1, wherein said converting the input pulsed signal to the intermediary pulsed signal and said repeatedly converting are performed by propagating the input pulsed signal in at least a first optical regenerator and a second optical regenerator optically connected together in a closed-loop configuration to form the cavity, the first optical regenerator being adapted to convert an incoming pulsed signal to the intermediary pulsed signal at the predetermined wavelength and the second optical regenerator being adapted to convert the intermediary pulsed signal at the predetermined wavelength to the buffer pulsed signal at the adjustable wavelength, the first and second optical regenerators each being one of an optical 2R-regenerator and an optical 3R-regenerator.

3. The method of claim 2, further comprising preventing the buffer pulsed signal, when at the output wavelength, from propagating from the second optical generator to the first optical regenerator.

4. The method of claim 2, wherein said propagating the input pulsed signal in a first optical regenerator comprises propagating the input pulsed signal in a first amplifier, a first nonlinear spectral broadening medium, and a first bandpass filter having a central wavelength corresponding to the predetermined wavelength.

5. The method of claim 4, wherein said converting the input pulsed signal at the input wavelength to the intermediary pulsed signal at the predetermined wavelength comprises amplifying, spectrally broadening, and spectrally filtering the input pulsed signal to obtain the intermediary pulsed signal.

6. The method of claim 2, wherein the second optical regenerator comprises a second amplifier, a second nonlinear spectral broadening medium, and a second bandpass filter having an adjustable central wavelength.

7. The method of claim 6, wherein said repeatedly converting comprises repeatedly:
   amplifying, spectrally broadening, and spectrally filtering the intermediary pulsed signal to obtain the buffer pulsed signal; and
   amplifying, spectrally broadening, and spectrally filtering the buffer pulsed signal to obtain the intermediary pulsed signal.

8. The method of claim 6, wherein said setting the adjustable wavelength of the buffer pulsed signal to the output wavelength comprises setting the adjustable central wavelength of the second bandpass filter to the output wavelength.

9. The method of claim 1, wherein said determining comprises:
   detecting the input pulsed signal and converting the input pulsed signal to an electrical signal; and
   determining the output wavelength from the electrical signal;

10. The method of claim 9, wherein said detecting is performed before said buffering.

11. The method of claim 1, wherein the information comprises at least destination information contained in a header of a data packet carried by the input pulsed signal.

12. An optical time-delayed wavelength converter for adjusting a wavelength of an optical pulsed signal, the converter comprising:
   a photodetector for detecting and converting an input pulsed signal to an electrical signal, the input pulsed signal containing information encoded therein and having an input wavelength;
   an output wavelength determining module for determining the output wavelength from the electrical signal;
   a closed-loop optical regenerative cavity for receiving the input pulsed signal, the cavity comprising at least a first optical regenerator for receiving the input pulse signal and a second optical regenerator optically connected together in a closed-loop configuration, the first and second optical regenerators each being one of an optical 2R-regenerator and an optical 3R-regenerator, the cavity being adapted to convert the input pulsed signal at the input wavelength to a buffer pulsed signal at an adjustable wavelength, and propagate and output the buffer pulsed signal therein as a function of the adjustable wavelength, the buffer pulsed signal containing the information encoded in the input pulsed signal; and a wavelength controller for controlling the adjustable wavelength of the buffer pulsed signal, the wavelength controller being adapted to set the adjustable wavelength to a buffer wavelength different from the output wavelength in order to propagate the buffer pulsed signal at the buffer wavelength within the cavity, and to the output wavelength upon reception of the output wavelength from the output wavelength determining module in order to output the buffer pulsed signal at the output wavelength from the cavity.

13. The optical time-delayed wavelength converter of claim 12, wherein the first optical generator is adapted to convert an incoming pulsed signal to an intermediary pulsed signal at a predetermined wavelength and the second optical regenerator is adapted to convert the intermediary pulsed signal to the buffer pulsed signal at the adjustable wavelength, the predetermined wavelength being chosen as a function of the buffer wavelength and the output wavelength so that the cavity supports eigenpulses, the eigenpulses being substantially identical at an input of the first optical regenerator and at an output of the second optical regenerator.

14. The optical time-delayed wavelength converter of claim 12, further comprising a spectral filter device positioned between the first and second optical regenerators for preventing a propagation of the buffer pulsed signal at the output wavelength from the second optical regenerator to the first optical regenerator.

15. The optical time-delayed wavelength converter of claim 13, wherein the first optical regenerator comprises a first amplifier, a first spectrally broadening medium, and a first bandpass filter having a central wavelength corresponding to the predetermined wavelength, and the second optical regenerator comprises a second amplifier, a second spectrally broadening medium, and a second bandpass filter being adjustable and controlled by the wavelength controller.

16. The optical time-delayed wavelength converter of claim 15, wherein the first amplifier is positioned one of upstream the first spectrally broadening medium, downstream the first bandpass filter, and between the first spectrally broadening medium and the first bandpass filter, and the second amplifier is positioned one of upstream the second spectrally broadening medium, downstream the second bandpass filter, and between the second spectrally broadening medium and the second bandpass filter.

17. The optical time-delayed wavelength converter of claim 12, wherein the information encoded in the input pulsed signal comprises destination information, the output wavelength determining module being adapted for:

determining the destination from the electrical signal; and determining the output wavelength from the destination.

18. The optical time-delayed wavelength converter of claim 17, wherein the information about the destination is contained in a header of a data packet carried by the input pulsed signal.

\* \* \* \* \*